United States Patent [19]

Kamiyama

[11] Patent Number: 4,543,198
[45] Date of Patent: Sep. 24, 1985

[54] FERRITE MAGNETIC MATERIAL FOR MAGNETIC RECORDING AND PROCESS FOR THE PREPARATION THEREOF

[75] Inventor: Kouzi Kamiyama, Kaisei, Japan
[73] Assignee: Fuji Photo Film Co., Ltd., Japan
[21] Appl. No.: 580,154
[22] Filed: Feb. 14, 1984
[30] Foreign Application Priority Data Feb. 16, 1983 [JP] Japan .................................. 58-24253

[51] Int. Cl.$^4$ ............................................. C04B 35/26
[52] U.S. Cl. ............................ 252/62.59; 252/62.56; 252/62.62; 252/62.63; 423/594
[58] Field of Search ............... 252/62.56, 62.39, 62.62, 252/62.63; 423/594

[56] References Cited

U.S. PATENT DOCUMENTS 3,162,603 12/1964 Kohn et al. ...................... 252/62.63
4,341,648 7/1982 Kubo et al. .................. 252/62.59 X
4,407,721 10/1983 Koike et al. ...................... 252/62.59

*Primary Examiner*—Jack Cooper
*Attorney, Agent, or Firm*—Murray, Whisenhunt and Ferguson

[57] ABSTRACT

A magnetoplumbite type ferrite magnetic material having the formula:

$$RFe_{12-2x}M_xM'_xO_{19}$$

wherein R is at least one metal atom selected from the group consisting of barium, strontium and lead, M is at least one divalent metal atom selected from the group consisting of cobalt, nickel and zinc, M' is at least one tetravalent metal atom selected from the group consisting of titanium, zirconium and hafnium, and x is a number ranging from 0.6 to 1.0; and further containing 1 to 1,000 ppm of platinum and/or gold therein.

A process for the preparation of the magnetoplumbite type ferrite magnetic material is also disclosed.

4 Claims, No Drawings

FERRITE MAGNETIC MATERIAL FOR MAGNETIC RECORDING AND PROCESS FOR THE PREPARATION THEREOF

BACKGROUND OF THE INVENTION

1. Field of the Invention

The present invention relates to a ferrite magnetic material for magnetic recording and a process for the preparation thereof, and more particularly relates to a finely divided ferrite magnetic material, which is suitable for use in perpendicular magnetic recording system, and to a process for the preparation of the magnetic material.

2. Description of Prior Arts

Heretofore, there has been used a magnetic recording system wherein a recording medium such as magnetic recording tape is magnetized along its longitudinal direction in the surface area thereof. A perpendicular magnetic recording system has been recently proposed for accomplishing high density magnetic recording, a various magnetic mediums for use in this system are under study.

There are known methods wherein a magnetic material layer is formed on a substrate (i.e., support) such as a film by a sputtering process, a vacuum deposition process, etc. as the method of preparing the magnetic recording medium for use in the perpendicular magnetic recording system. For example, there has been developed a magnetic recording medium wherein a layer of a magnetic material such as cobalt-chromium is formed on a substrate by the sputtering process.

However, the process for preparing the magnetic recording medium utilizing said sputtering process or vacuum deposition process has disadvantages in productivity and product quality as compared with the conventional process for preparing the magnetic recording medium utilizing the conventional coating process. Accordingly, methods utilizing the coating process are also studied as the process for preparing the magnetic recording medium for use in the perpendicular magnetic recording system.

For example, there has been proposed a process for preparing the magnetic recording medium for use in the perpendicular magnetic recording system wherein a hexagonal ferrite such as hexagonal barium ferrite in the form of fine particles having a hexagonal plate shape is used as the magnetic material, the hexagonal ferrite is mixed with and dispersed in a resin (binder) and the surface of a substrate is coated with the ferrite.

As said hexagonal ferrite in the form of fine particles having a hexagonal plate shape, magnetoplumbite type hexagonal crystal ferrite is known and represented by the following formula:

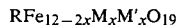

$$RFe_{12-2x}M_xM'_xO_{19}$$

wherein R is at least one metal atom selected from the group consisting of barium, strontium and lead, M is at least one divalent metal atom selected from the group consisting of cobalt, nickel and zinc, M' is at least one tetravalent metal atom selected from the group consisting of titanium, zirconium and hafnium, and x is a number ranging from 0.6 to 1.0.

As typical processes for preparing the hexagonal ferrite such as hexagonal barium ferrite used as the magnetic material for the above-mentioned magnetic recording medium, there are known wet processes (such as co-precipitation process and hydrothermal synthetic process), vitrification process, etc.

Among the above-mentioned processes, the preparation of the hexagonal ferrite magnetic material by the vitrification process is generally carried out in the following manner. A mixture of starting materials containing the desired ferrite component and a glass-forming component is melted and then rapidly cooled to form an amorphous material which is then heat-treated as such to form and deposit hexagonal ferrite crystals therefrom, and other materials such as glass component, etc. than the ferrite crystals are removed from the material obtained from the above heat-treatment (hereinafter referred to as heat-treated material).

The starting material mixture for used in the preparation of the hexagonal ferrite magnetic material by the vitrification process usually contains a basic component for the hexagonal ferrite, a coercive force-reducing component and a glass-forming component.

As the basic component for the hexagonal ferrite, $Fe_2O_3$ in combination with a metal oxide or oxides such as BaO, SrO and PbO is used. As the coercive force-reducing component, a combination of a divalent metal oxide or oxides such as CoO, NiO and ZnO with a tetravalent metal oxide or oxides such as $TiO_2$, $ZrO_2$ and $HfO_2$ is used. As the glass-forming component, boron oxide ($B_2O_3$) is generally used. Alternatively, there may be incorporated in the starting material mixture the above-mentioned components in the form of compounds or salts (for example, carbonate, nitrate and boric acid for boron) capable of being converted into the above-mentioned oxides under heating conditions in the melting range of the starting material mixing.

The ferrite magnetic material in the shape of hexagonal plate, which is suitable for use in the perpendicular magnetic recording system, is in the form of fine particle wherein the diameter of the hexagonal plate is 0.1 $\mu$m or below and the thickness thereof is 0.03 $\mu$m or below. In order to prepare such magnetic material in the form of fine particle, there is used in the conventional vitrification process, for example, a process wherein the molten starting material mixture containing the above-mentioned components is quenched to convert it into an amorphous material which is then heat-treated to form and deposit a hexagonal ferrite crystal. As the method of quenching the molten mixture, there is used a method wherein the molten starting material mixture is brought into contact with the surface of rotating metallic rolls by pouring the molten mixture onto said surface (called roll method).

Although the ferrite crystal is formed and deposited by the heat treatment of the amorphous material in the process mentioned above, the formation of the nucleus of the ferrite crystal partly appears in the quenching stage of the molten mixture. However, the quenched material is essentially composed of an amorphous material, so that it is called amorphous material as a whole.

It is desirable that the breadth of particle size distribution of the fine particles of the hexagonal ferrite magnetic material used for magnetic recording material is as narrow as possible, and further that any of coarse particles and particles having an extremely small particle size is not contained. This is because noise is caused by the coarse particle in the magnetic recording medium and the presence of the extremely small particle makes the magnetic recording medium magnetically unstable. Thus, it is desirable that the breadth of particle size distribution of the hexagonal ferrite magnetic material used for magnetic recording medium is as narrow as possible, but the breadth of particle size distribution of the magnetic material obtained by conventional vitrification process is wide and relatively large amounts of coarse particles and extremely small particles are contained. Therefore, it is not said that conventional vitrification process is practically excellent process for preparing the hexagonal ferrite magnetic material. Accordingly, it is highly desired to develop a process for preparing a hexagonal ferrite magnetic material, said process being capable of obtaining a ferrite magnetic material in which the breadth of particle size distribution is narrower than that obtained by conventional vitrification process.

SUMMARY OF THE INVENTION

The inventor has studied to find out an improved process which is free from disadvantages associated with the process for preparing the hexagonal ferrite magnetic material for magnetic recording using conventional vitrification process. The inventor has discovered that when a small amount of platinum and/or gold is incorporated in the starting material mixture for the preparation of the hexagonal ferrite magnetic material and platinum and/or gold are caused to function as a nucleating agent in the formation of the ferrite crystal, there can be obtained a hexagonal ferrite magnetic material for magnetic recording, which is in the form of fine particule and whose breadth of particle size distribution is narrow (namely, the uniformity of particle size being high).

Accordingly, the present invention provides a magnetoplumbite type ferrite magnetic material for magnetic recording, having the formula:

$$RFe_{12-2x}M_xM'_xO_{19}$$

wherein R is at least one metal atom selected from the group consisting of barium, strontium and lead, M is at least one divalent metal atom selected from the group consisting of cobalt, nickel and zinc, M' is at least one tetravalent metal atom selected from the group consisting of titanium, zirconium and hafnium, and x is a number ranging from 0.6 to 1.0 and further containing from 1 to 1,000 ppm of platinum and/or gold.

DETAILED DESCRIPTION OF THE INVENTION

The magnetoplumbite type ferrite magnetic material of the present invention used for magnetic recording can be prepared in the following manner.

There is used, as the starting material, a mixture containing a basic component for the hexagonal ferrite, a coercive force-reducing component, a glass-forming component and further platinum and/or gold or platinum compound and/or a gold compound in such an amount as to give from 1 to 2,000 ppm of Pt and/or Au based on the combined amount of the above components. This mixture is melted, the molten mixture is quenched to obtain an amorphous material which is then heat-treated to form ferrite crystals, and components such as glass component, etc. other than the ferrite crystal are removed from the heat-treated material.

The above-mentioned process is characterized by introducing a specified amount of platinum and/or gold or a platinum compound and/or a gold compound into the starting material mixture which is used for the preparation of the hexagonal ferrite magnetic material for magnetic recording using the conventional vitrification process. Therefore, the basic component for the hexagonal ferrite, the coercive force-reducing component and the glass-forming component other than the platinum and gold component can be arbitravily chosen on the basis of conventional arts.

In the preferred embodiment of the starting material mixture for the ferrite of the present invention, said mixture contains each component constituting said mixture in such an amount (in terms of oxide or metal) that the amount of $B_2O_3 + SiO_2$ is from 20 to 40 molar % (preferably in the molar ratio of $SiO_2/(B_2O_3 + SiO_2)$ of 0.05 to 0.8), that of RO is from 25 to 50 molar %, that of $Fe_2O_3$ is from 20 to 50 molar %, that of MO is from 2 to 10 molar %, that of $M'O_2$ is from 2 to 10 molar % and that of Pt and/or Au is from 1 to 2,000 ppm based on the combined amount of $B_2O_3$, $SiO_2$, RO, $Fe_2O_3$, MO and $M'O_2$ wherein R is at least one metal atom selected from the group consisting of barium, strontium and lead, M is at least one divalent metal atom selected from the group consisting of cobalt, nickel and zinc, and M' is at least one tetravalent metal atom selected from the group consisting of titanium, zirconium and hafnium.

In the above description, each component is expressed as an oxide and the content thereof is expressed in terms of the oxide. However, each component may be used in the form of a comound or a salt capable of being converted into the above oxide under heating conditions in the melting stage of the starting material mixture. For instance, $B_2O_3$ may be introduced in the form of boric acid into the mixture, and other metallic components in the form of a compound having a relatively low melting point such as carbonate or nitrate may be introduced into the mixture.

Pt(platinum) and/or Au(gold) may be introduced as fine metallic powder into the starting material mixture, but it is preferred to introduce them in the form of a metallic compound into the mixture. For example, it is preferred to introduce platinum in the form of $H_2[PtCl_6].6H_2O$ and gold in the form of $H[AuCl_3]4H_2O$ into the starting material mixture. A part of Pt and/or Au introduced into the mixture is lost during the course of preparation of fine ferrite particles by volatilization, etc. so that it is preferred to introduce them in an amount of about twice as much as the required amount.

When the content of Pt and/or Au in the ferrite magnetic material of the present invention is less than 1 ppm, the effect of obtaining the uniformity of particle size is unsatisfactory, that is, the principal purpose of the present invention can not be achieved, while when the content exceeds 1,000 ppm, there arises a trouble causing reduction in saturation magnetization and it is costly disadvantageous.

The following illustrates the process for the preparation of the ferrite magnetic material of the present invention used for magnetic recording.

Each of the starting material components and the required amounts of platinum and/or gold (usually in the form of a compound) are weighed in such a proportion as to prepare a magnetoplumbite type hexagonal ferrite having the following formula:

$$RFe_{12-2x}M_xM'_xO_{19}$$

wherein R, M, M' and x are as defined above. These components are thoroughly mixed together to obtain a starting material mixture for ferrite. The mixture is melted by heating it to a vicinity of the melting temperature of each component, for example, at a temperature of from 1250° to 1400° C., and quenched to form an amorphous material.

The so-obtained amorphous material is heat-treated to form and deposit a hexagonal ferrite crystal therefrom, and components such as glass component, etc. other than the ferrite crystal are removed from the heat-treated material by utilizing a treating technique such as etching treatment with an acid to obtain fine ferrite crystal powder.

The heat-treatment of the amorphous material to deposit the ferrite crystals is a conventional technique, and can be conducted, for example, by heating the amorphous material at a temperature of from 700° to 950° C.

The fine ferrite crystals obtained by conducting the above removal treatment of the glass component, etc. are subjected to a rinsing treatment and a drying treatment in a similar manner to that of conventional technique, whereby the desired magnetic material in the form of fine particle (ferrite magnetic material for magnetic recording) can be obtained.

The ferrite magnetic material for magnetic recording, prepared by using the above starting material mixture containing from 1 to 2,000 ppm of platinum and/or gold according to the process of the present invention, is a magnetoplumbite type hexagonal ferrite having the formula:

$$RFe_{12-2x}M_xM'_xO_{19}$$

wherein r, M, M' and x are as defined above, and further containing from about 1 to 1,000 ppm of platinum and/or gold therein.

The ferrite magnetic material of the present invention has particle size distribution narrower than that of the ferrite prepared by the conventional process. Therefore, the ferrite magnetic material of the present invention is ferrite magnetic material powder having high uniformity in particle size.

The effect of adjusting the particle size of the ferrite powder prepared by introducing a given amount of platinum and/or gold into the starting material mixture can be further increased by using $SiO_2$ in combination with $B_2O_3$ in a specified ratio instead of using only $B_2O_3$ as the glass-forming component. Hence, it is preferred to use $B_2O_3$ and $SiO_2$ in a molar ratio of $SiO_2/(B_2O_3+SiO_2)$ of from 0.05 to 0.8 as the glass-forming component to be introduced into the starting material mixture in the preparation of the ferrite magnetic material of the present invention.

The breadth of particle size distribution of the ferrite magnetic material of the present invention for magnetic recording is narrower than that of the conventional one. Therefore, the magnetic recording medium using the ferrite magnetic material of the present invention is magnetically stable and noise caused during magnetic recording and regenerative output is remarkably reduced.

Accordingly, the ferrite magnetic material of the present invention is particularly superior as a magnetic material for use in a magnetic recording medium for perpendicular magnetic recording system.

The following example and comparative example are provided to illustrate the present invention. Although the example shows the case where platinum was used as a nucleating agent, a similar result could be obtained when gold was used in place of platinum.

EXAMPLE 1

As starting materials for the preparation of a ferrite magnetic material, various starting compounds were weighed in such an amount (in terms of oxide) as to give 2 molar % of $SiO_2$, 25 molar % of $B_2O_3$, 35 molar % BaO, 29 molar % of $Fe_2O_3$, 4.5 molar % of CoO and 4.5 molar % of $TiO_2$. $H_2[PtCl_6] \cdot 6H_2O$ was weighed in such an amount as to give a Pt content of 10 ppm based on the combined amount of the above compounds. These compounds were thoroughly mixed in an automatic mortar.

The resulting starting material mixture was placed in a crucible made of electroformed zirconium, and melted by heating it to a temperature of from 1300° to 1350° C. with stirring in a furnace with a silicon carbide heating element. The molten mixture was caused to spout from fine hole into the gap between twin rolls to cool it, whereby a flaky amorphous material was obtained.

The amorphous material was placed in a heat-treating furnace whose temperature was elevated to 500° C. at a rate of 1200° C./hr, kept at 500° C. for 6 hours, then elevated to 800° C., kept at 800° C. for 5 hours and cooled to room temperature at a rate of 120° C./hr to deposit ferrite crystals from the amorphous material.

The so-obtained heat-treated material containing the ferrite crystal was thoroughly crushed in a mortar and subjected to an ethcing treatment (a treatment for removing components such as glass component, etc. other than the ferrite crystal) with 6N acetic acid at 80° C. for 5 hours, to a washing treatment with water and then to a vacuum drying treatment at 120° C. for two hours to obtain a barium ferrite crystal (barium ferrite magnetic material) in the form of fine particle. This barium ferrite had the following formula:

$$BaFe_{10.4}Co_{0.8}Ti_{0.8}O_{19}$$

and contained 5 ppm of Pt.

The above barium ferrite magnetic material had properties such that saturation magnetization ($\delta s$) was 54.8 emu/g, coercive force (Hc) was 1070 oersted (Oe) and specific surface area (BET method) was 26.6 m²/g.

The above barium ferrite magnetic material in the form of fine particle was examined with a transmission type electron microscope and it was found that average particle size was 0.08 $\mu$m and particle size distribution was within the range of from 0.05 to 0.11 $\mu$m.

Comparative Example 1

The procedure of Example 1 was repeated except that Pt was not introduced into the starting material mixture. There was obtained a barium ferrite crystal (barium ferrite magnetic material) in the form of fine particle.

The results of this barium ferrite magnetic material in respect of saturation magnetization, coercive force and specific surface area were substantially equal to those of the barium ferrite magnetic material obtained in Example 1.

However, when the barium ferrite magnetic material in the form of fine particle obtained in this Comparative Example was examined with a transmission type electron microscope, average particle size was 0.08 $\mu$m equal to that of the magnetic material of Example 1, but it was found that the particle size of a considerably large amount of particles was outside the range of form 0.05 to 0.11 μm (which was the particle size range of the magnetic material of Example 1).

I claim:

1. A process for the preparation of a magnetoplumbite type ferrite magnetic material having the formula $$RFe_{12-2x}M_xM'_xO_{19}$$

wherein R is at least one metal atom selected from the group consisting of barium, strontium and lead, M is at least one divalent metal atom selected from the group consisting of cobalt, nickel and zinc, M' is at least one tetravalent metal atom selected from the group consisting of titanium, zirconium and hafnium, and x is a number ranging from 0.6 to 1.0; and further containing from 1 to 1,000 ppm of platinum and/or gold therein, said process comprising the steps of (1) melting a starting material mixture containing a basic component for hexagonal ferrite comprising $Fe_2O_3$ and at least one oxide selected from the group consisting of BaO, SrO and PbO or compounds convertible into said oxides during melting, a coercive force-reducing component including M and M', and glass-forming component, (2) rapidly cooling the resulting molten mixture to obtain an amorphous material, (3) heat-treating said amorphous material to form ferrite crystals and (4) removing components other than ferrite crystals from the material resulting from said heat-treatment; characterized in that from 1 to 2,000 ppm of platinum and/or gold is contained in said starting material mixture, said magnetoplumbite type ferrite magnetic material having a narrower particle size distribution than said ferrite prepared as above, absent platinum and gold.

2. The process for the preparation of a ferrite magnetic material as claimed in claim 1, wherein said starting material mixture contains:

as the glass-forming component:
$B_2O_3 + SiO_2$ in an amount of from 20 to 40 molar %, in terms of an oxide or metal;

as the basic component for hexagonal ferrite:
RO in an amount of from 25 to 50 molar %, in terms of an oxide or metal, wherein R is at least one metal atom selected from the group consisting of barium, strontium and lead, and $Fe_2O_3$ in an amount of from 20 to 50 molar %, in terms of an oxide or metal; and as the coercive force-reducing component:
MO in an amount of from 2 to 10 molar %, in terms of an oxide or metal, wherein M is at least one divalent metal atom selected from the group consisting of cobalt, nickel and zinc, and $M'O_2$ in an amount of from 2 to 10 molar %, in terms of an oxide or metal, wherein M' is at least one tetravalent metal atom selected from the group consisting of titanium, zirconium and hafnium; and platinum and/or gold in an amount of from 1 to 2,000 ppm based on the combined amount of said $B_2O_3$, $SiO_2$, RO, $Fe_2O_3$, MO and $M'O_2$, wherein the molar ratio of $SiO_2/(B_2O_3+SiO_2)$ is within the range of from 0.05 to 0.8.

3. A magnetoplumbite type ferrite magnetic material having the formula:

$$RFe_{12-2x}M_xM'_xO_{19}$$

wherein R is at least one metal atom selected from the group consisting of barium, strontium and lead, M is at least one diavalent metal atom selected from the group consisting of cobalt, nickel and zinc, M' is at least one tetravalent metal atom selected from the group consisting ot titanium, zirconium and hafnium, and x is a number ranging from 0.6 to 1.0 and further containing from 1 to 1,000 ppm of platinum and/or gold, produced by the process comprising the steps of (1) melting a starting material mixture containing a basic component for hexagonal ferrite comprising $Fe_2O_3$ and at least one oxide selected from the group consisting of BaO, SrO and PbO or compounds convertible into said oxides during melting, a coercive force-reducing component including M and M', and glass-forming component, (2) rapidly cooling the resulting molten mixture to obtain an amorphous material, (3) heat-treating said amorphous material to form ferrite crystals and (4) removing components other than ferrite crystals from the material resulting from said heat-treatment; characterized in that from 1 to 2,000 ppm of platinum and/or gold is contained in said starting material mixture, said magnetoplumbite type ferrite magnetic material having a narrower partizle size distribution than said ferrite prepared as above, absent platinum and gold.

4. The ferrite magnetic material as claimed in claim 3, wherein R is barium.

* * * * *